United States Patent [19]

Spencer

[11] 4,245,581
[45] Jan. 20, 1981

[54] PARSLEY APPLICATOR

[75] Inventor: Rupert L. Spencer, Joplin, Mo.

[73] Assignee: The Pillsbury Company, Minneapolis, Minn.

[21] Appl. No.: 95,605

[22] Filed: Nov. 16, 1979

[51] Int. Cl.³ .............................................. B05C 19/00
[52] U.S. Cl. ........................................ 118/24; 118/308; 99/494
[58] Field of Search ................. 118/24, 25, 308, 312, 118/612; 222/161, 196, 200; 99/494, 450.1

[56] References Cited
U.S. PATENT DOCUMENTS

| | | | |
|---|---|---|---|
| 870,569 | 11/1907 | MacDonald et al. | 118/308 X |
| 943,204 | 12/1909 | Treischman et al. | 118/24 X |
| 1,748,543 | 2/1930 | Devlin | 118/308 X |
| 2,311,373 | 2/1943 | Durning | 222/161 X |
| 3,283,740 | 11/1966 | Fredricksen | 118/24 |

Primary Examiner—John P. McIntosh
Attorney, Agent, or Firm—Robert J. Lewis; Michael D. Ellwein; Mart C. Matthews

[57] ABSTRACT

A particulate material dispenser for use with a conveyor system wherein particulate material is applied to a plurality of substrate receiving bases carried on the conveyor system; comprising a hopper mounted on a frame over a portion of the conveyor system and having a front wall, a rear wall, a pair of spaced vertical side walls, and a reduced bottom wall. The bottom wall is provided with a plurality of spaced and aligned openings for allowing the passage of particulate material therethrough. An agitator shaft is disposed horizontally above the openings and has opposite ends journalled in the side walls. A plurality of tines are mounted on the agitator shaft and extend downwardly therefrom so that their lower ends are adjacent the openings. A motor is connected to the agitator shaft through intermediate collar rods, links, etc. to oscillate the shaft so to cause the tines to swing in an arc above the openings thereby urging the particulate material through the openings.

4 Claims, 3 Drawing Figures

PARSLEY APPLICATOR

BACKGROUND OF THE INVENTION

1. Field of the Invention

The present invention relates to a particulate material dispenser, more specifically a parsley applicator employed to deposit parsley flakes or the like onto a plurality of articles or receiving bases, such as pizza shells, carried on a moving conveyor belt.

2. Description of the Prior Art

Particulate material dispensers or applicators, which deposit various types of solid particles onto articles carried on a conveyor belt, are well-known in the prior art. A device, as disclosed in U.S. Pat. No. 3,926,146 to Breyer, et al., incorporates a combing action to strip particulate material from pins; however, this device does not readily lend itself for use with fine or granulated particles which have a tendency to adhere to each other rather than the pins. The known art also discloses devices that require an electrostatic field (U.S. Pat. No. 3,468,691 to Watkins) or suspension of particles in a turbulent stream of air (U.S. Pat. No. 3,918,399 to Fox, et al.) in order to uniformly dispense self-adherent particles onto substrate moving bases. None of the prior art incorporates an oscillating or sweeping action in combination with a vibrating action to insure a constant flow and uniform application of the particulate material.

SUMMARY OF THE INVENTION

Frozen pizza is currently made by an assembly line process, partly automatically, and partly by hand, by adding the pizza ingredients to a preformed, generally circular, crust base or shell. These bases are generally arranged closely spaced on a moving conveyor belt, and move through various stations where they are provided with a layer of tomato sauce, a layer of cheese and a layer of ground meat. The ground meat or the like can be deposited automatically by a device such as that disclosed in co-pending patent application Ser. No. 053,739, filed on July 2, 1979, and entitled "Apparatus for Depositing Particulate Material onto a Moving Conveyor Belt".

The present invention does not concern itself with the application of tomato sauce or the manner in which shredded cheese or ground meat is applied to the pizza shells since these operations will have preceded the intended function of the present invention. The present invention relates to a particulate material dispenser, for example, a parsley applicator which deposits parsley flakes onto pizza shells closely spaced on a moving conveyor belt. Parsley flakes are used on pizzas generally for decorative purposes and are therefore applied last to the completed shells. Parsley flakes have a tendency to adhere to each other, making uniform application on the pizza shells difficult by hand. It is advantageous, therefore, to automate the application so as to conform to uniform standards. In addition, the present invention can be readily altered to dispense a variety of particulate material, especially the type which may adhere together during hand application.

The parsley applicator of the present invention comprises a hopper which can be mounted on a frame so as to be disposed above a portion of a conveyor carrying a plurality of closely spaced pizza shells. The hopper is provided with an open top, a pair of spaced vertical side walls, a front wall and a rear wall. The front and rear walls converge toward each other, forming a reduced bottom wall.

The bottom wall of the hopper is provided with a plurality of aligned cruciform-shaped openings. An agitator shaft is disposed horizontally in the hopper above the openings and has its ends extending through the side walls. One end of the agitator shaft, herein designated the drive end, protrudes farther from its side wall than the opposite end of the agitator shaft protrudes from its respective side wall. These ends are rotatably mounted on the inside of the side wall by bearings which are affixed to the hopper by bolts. The agitator shaft is held in a fixed lateral position by set collars adjacent the bearings.

A plurality of tines are welded to the agitator shaft and project downwardly from the shaft. The lower ends of the tines will just enter the openings in the bottom wall when the tines are perpendicular to the openings. During the operation, the tines will swing above and to the sides of the openings.

An elongated vertical rod is received in the drive end of the agitator shaft. The rod extends downwardly and a bushing is welded to its lower end. The bushing is pivotally connected to a disc on one end of the link. The link is comprised of a rod which is threadedly received into a larger cylindrical housing. The other end of the link is provided with a bearing disc which is pivotally connected to an off-center or eccentric hole in a collar. The collar is connected to an output shaft on a motor-driven gear box. The output shaft turns the collar which causes the link to reciprocate in a horizontal direction. The reciprocating motion causes the tines to sweep thereby assisting the discharge of parsley flakes through the openings.

A distribution plate, welded on the lower portion of the hopper, extends downwardly at an angle beneath the openings. A vibrator is mounted on the rear wall above the distribution plate and provides vibration to both the hopper and the distribution plate. When the parsley flakes fall through the openings onto the plate, the vibration will cause the flakes to bounce off the plate onto the pizza shells.

DETAILED DESCRIPTION OF THE PREFERRED EMBODIMENTS

The present invention relates to a particulate material dispenser, more specifically a parsley applicator used in conjunction with a conveyor system for transporting a plurality of pizza shells, for example, beneath the applicator.

Figure 3:
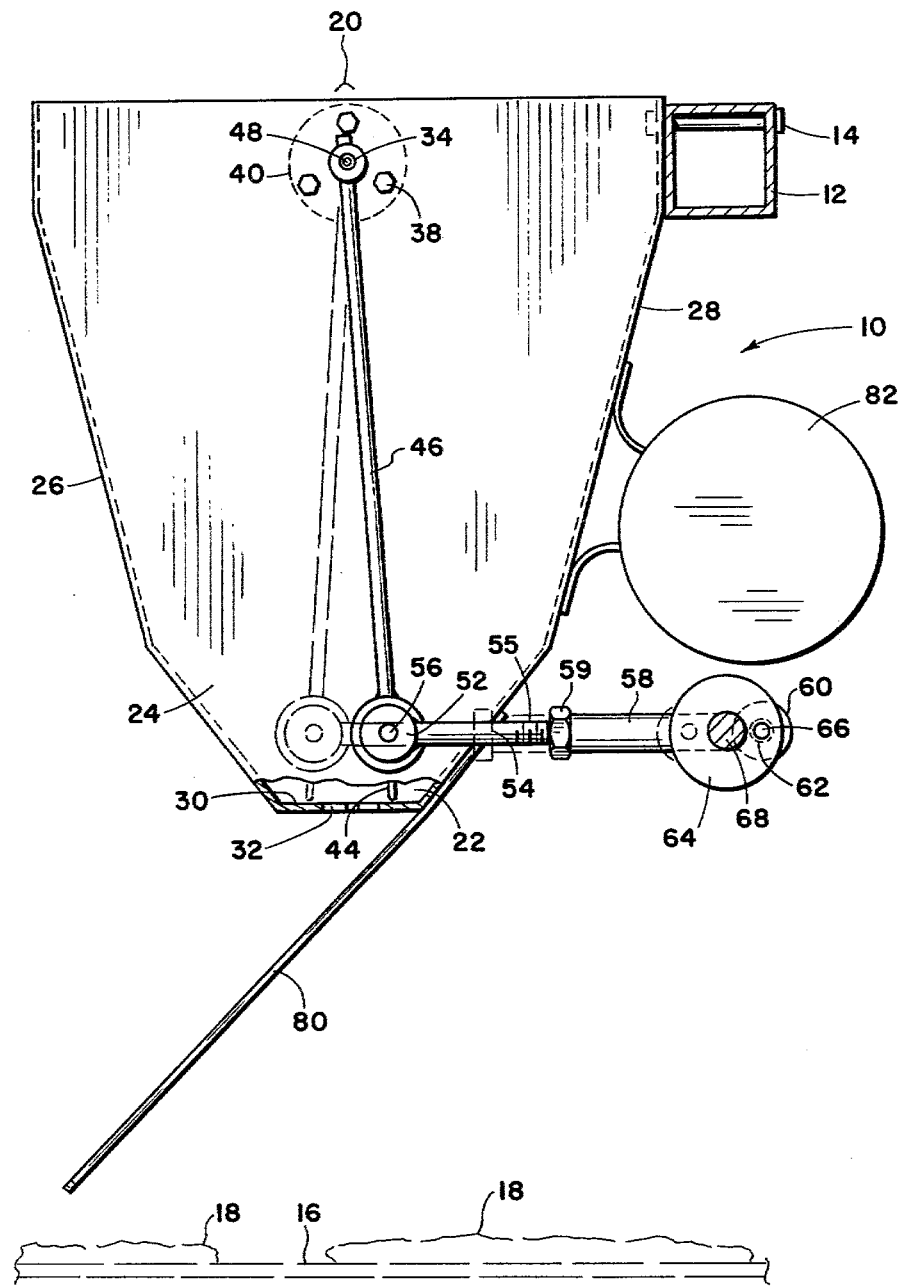
FIG. 3 is a cross-sectional view taken along line 3—3 of FIG. 2, showing a portion of a conveyor belt and pizza shells in broken lines beneath the apparatus of the present invention.

As best illustrated in FIG. 3, the present invention comprises a hopper 10 which is mounted on a frame 12 by means of bolt 14, so as to be disposed over a portion of a conveyor belt 16 carrying a plurality of serially arranged articles or receiving bases 18. In this application, bases 18 are pizza shells, although this invention is not limited thereto.

Hopper 10 is provided with an open top 20, a first vertical side wall 22 and a second vertical side wall 24, which are horizontally spaced and parallel to each other. A front wall 26 and a rear wall 28 of hopper 10 converge towards each other thereby forming a reduced bottom 30. As shown, hopper 10 is mounted on frame 12 along the upper portion of rear wall 28.

Frame 12 can be supported from a floor or deck (not shown) in any conventional manner, and is preferably constructed from stainless steel tubing.

Figure 1:
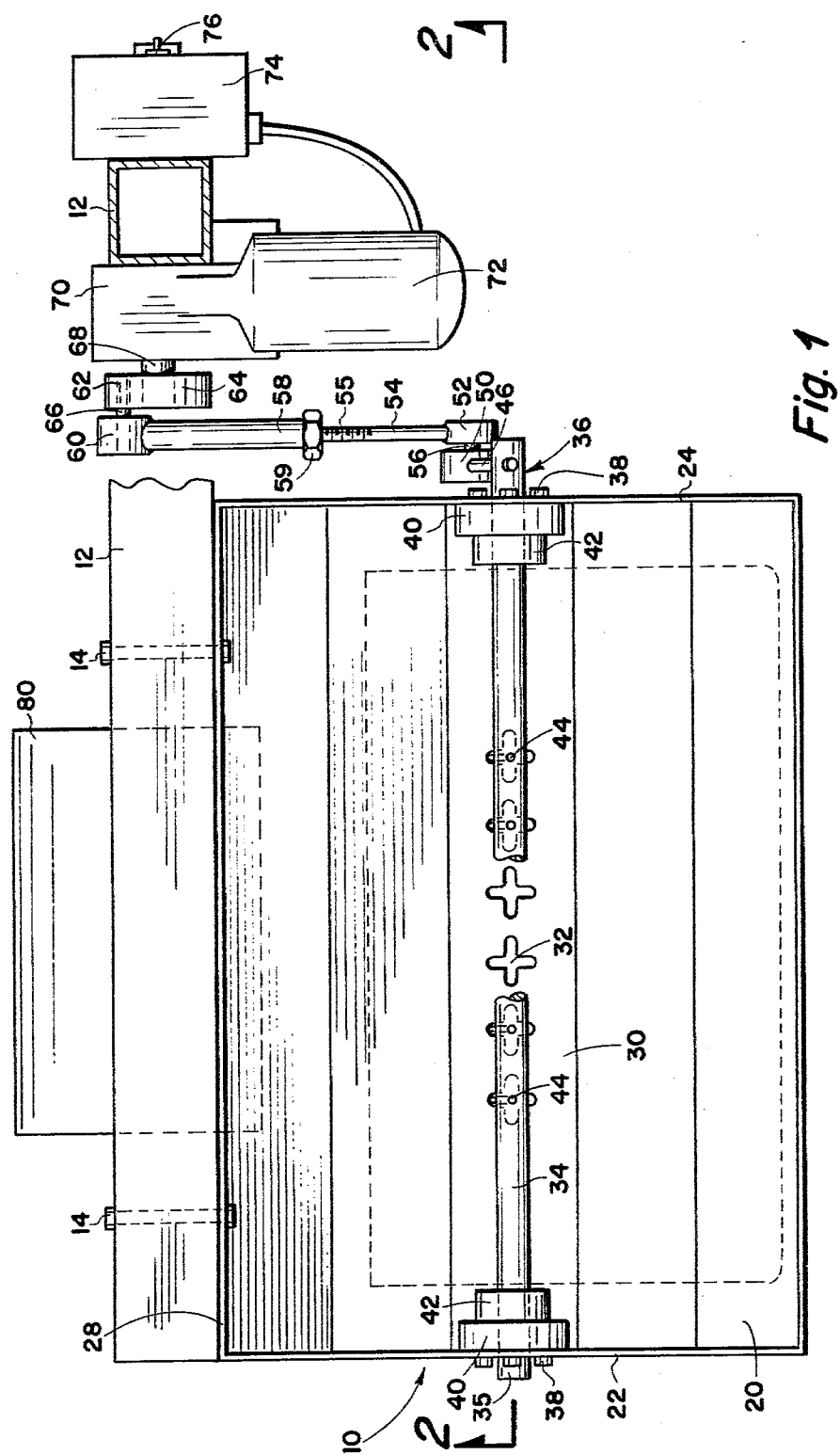
FIG. 1 is a top plan view of the present invention with certain parts being broken away for clarity and with certain hidden parts being shown in broken lines.

As illustrated in FIG. 1, bottom 30 of hopper 10 is provided with a plurality of distribution holes 32, shown in the present invention as cruciform configurations. An agitator shaft 34, disposed horizontally in hopper 10 above distribution holes 32, has its ends 35 and 36 extending through side walls 22 and 24. Drive end 36 of agitator shaft 34 protrudes farther from side wall 24 than the opposite end 35 protrudes from side wall 22. The aforementioned ends of agitotor shaft 34 are rotatably mounted in side walls 22 and 24 by means of bearing 40 which is connected to the inside of hopper 10 by means of bolts 38. Agitator shaft 34 is held in place by set collars 42 which are affixed to agitator shaft 34 by conventional set screws (not shown). Set collars 42 provide the means whereby agitator shaft 34 can be adjusted laterally.

Figure 2:
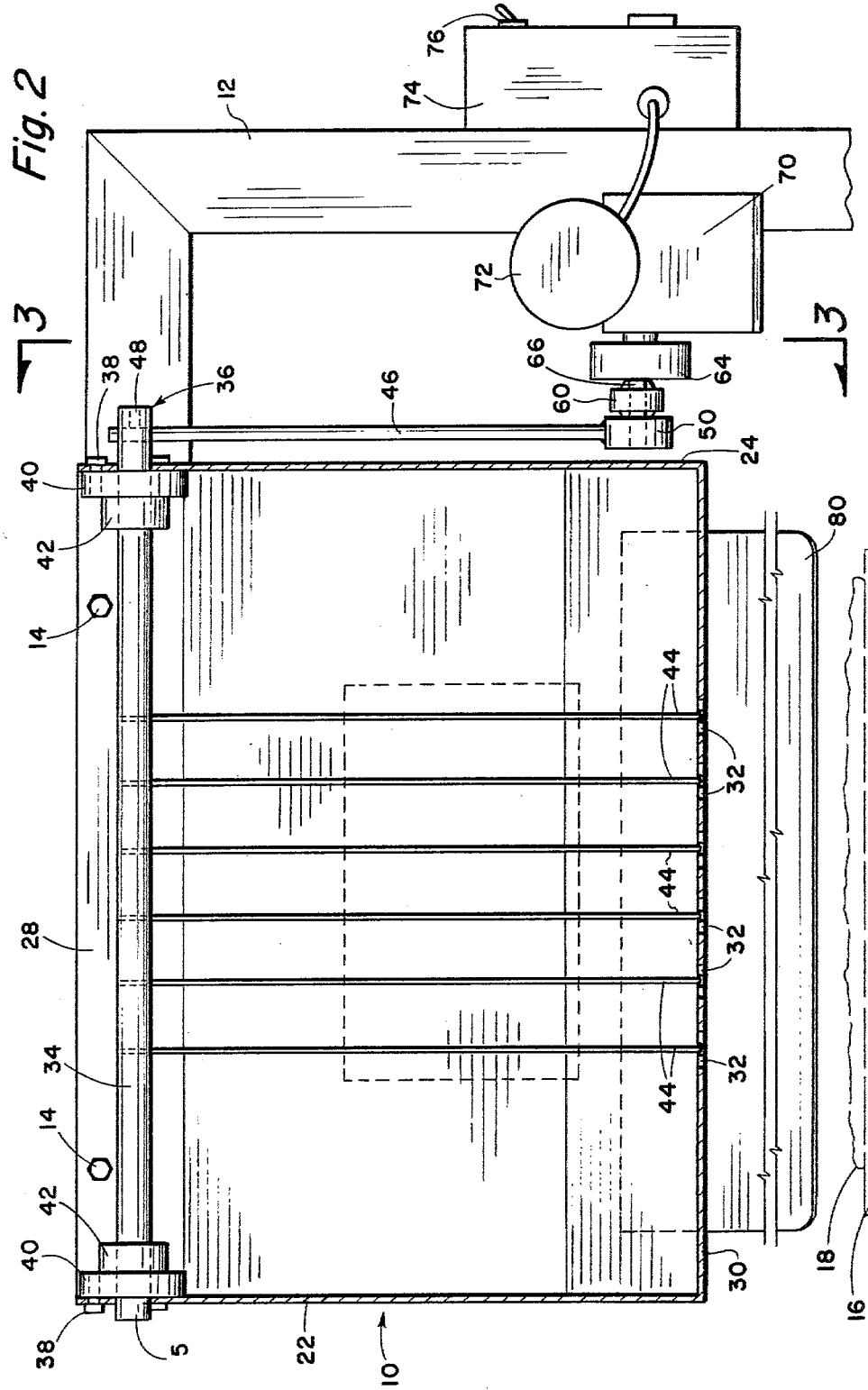
FIG. 2 is a cross-sectional view taken along line 2—2 of FIG. 1.

Referring to FIG. 2, a plurality of tines 44 are welded onto agitator shaft 34. Tines 44 project vertically downwardly from agitator shaft 34 such that the lower ends of tines 44 just enter distribution holes 32 when tines 44 are perpendicular to their respective distribution holes. Tines 44 have been adapted to swing above and to the sides of distribution holes 32 in a manner to be described hereinafter.

Returning to a further consideration of FIG. 1, externally of hopper 10, an elongated vertical rod 46 is received in a suitable hole in drive end 36 of agitator shaft 34. Rod 46 is held in place in the aforementioned hole by means of a set screw (FIG. 3) and extends downwardly from agitator shaft 34. The lower end of rod 46 is welded to a bushing 50. Bushing 50 is pivotally connected to a disc 52 on one end of a link 54 by means of a bolt or pin 56. Link 54 is comprised of a rod 55 which is threadedly (or rotatably) received in a larger cylindrical housing 58, which is internally threaded (or otherwise conformed) to receive the threading of rod 55 and thereby provide a means for changing the overall length of link 54. A locking nut 59 is provided to lock the elements 55 and 58 in position when the proper length of link 54 is achievved. The other end of link 54 is provided with a bearing disc 60, which is pivotally connected to an off-center or eccentric hole 62 in a collar 64 by means of a bolt or pin 66. Collar 64 is connected to an output shaft 68 on a gear box 70 by means of a set screw (not shown). Gear box 70 is driven by an electric motor 72 whose speed is controlled by a rheostat (not shown) in a control box 74. A toggle (on-off) switch 76 is affixed to the outside of control box 74. Gear box 70, electric motor 72, the rheostate in control box 74 and toggle switch 76 are all of a conventional type.

Returning to FIG. 3, a distribution plate 80 is welded to the lower portion of rear wall 28 of hopper 10, and extends downwardly at an angle therefrom beneath distribution holes 32. A vibrator 82, of a conventional type, is mounted on rear wall 28 between frame 12 and distribution plate 80 by means of bolts (not shown). Vibrator 82 is controlled by the rheostat in control box 74 and supplies vibration to hopper 10 which is also transmitted to distribution plate 82 during the operation.

The entire construction of the above is preferably stainless steel with the exception of motors, bearings and electrical apparatus.

The above constitutes the parts and assembly of the applicator of the present invention. The following description sets forth the operation of the applicator:

For the purpose of illustration, dried parsley flakes may constitute the particulate material which can be applied to pizza shells 18 passing underneath distribution plate 80 and carried on conveyor belt 16. It should be noted that the configuration of distribution holes 32 can be altered to allow passage of any desired particulate material for application onto a plurality of closely spaced bases 18.

Parsley flakes are introduced into hopper 10 and electric motor 72 and vibrator 82 are activated by flipping toggle switch 72. As shown in FIG. 3, link 54 will reciprocate in a horizontal direction caused by the action of bearing disc 60. The reciprocating motion of link 54 will cause rod 46 to oscillate through an arc of approximately 10°, thereby causing tines 44 within hopper 10 to oscillate or sweep through the same arc. The sweeping action of tines 44 and the vibration of hopper 10 assures a constant flow of parsley flakes through distribution holes 32 onto distribution plate 80. Distribution plate 80 vibrates in an arc of approximately 5° causing the parsley flakes to bounce off the plate. The vibration acts in conjunction with the sweeping action of tines 44 and thus provides a means for the parsley flakes to fall onto pizza shells 18 in an even pattern as the shells pass beneath distribution plate 80.

Whereas the present invention has been described in particular relation to the drawings attached hereto, it should be understood that other and further modifications, apart from those shown or suggested herein, may be made within the spirit and scope of this invention.

What is claimed is:

1. A particulate material dispenser for use with a conveyor system wherein particulate material is applied to a plurality of substrate receiving bases carried on said conveyor system; comprising a hopper mounted over a portion of said conveyor system, said hopper having a front wall, a rear wall, a pair of spaced side walls and a reduced bottom wall, said bottom wall having a plurality of spaced and aligned openings for allowing the passage of particulate material therethrough, an agitator shaft disposed horizontally above said openings and having opposite ends extending through said side walls, means for rotatably mounting said ends of said agitator shaft on said side walls, a pluralitty of elongated tines mounted on said agitator shaft and extending downwardly therefrom, said tines having lower ends terminating adjacent said openings, means for providing an oscillating motion to said agitator shaft whereby said tines swing in an arc over said openings to assist in the discharge of particulate material therethrough, a distribution plate on the lower portion of said hopper and extending downwardly at an angle therefrom beneath said openings, and means for vibrating said hopper and said distribution plate whereby particles passing through said openings bounce off said distribution plate onto said bases.

2. A particulate material dispenser as set forth in claim 1 wherein said means for providing an oscillating motion comprises a motor having a rotatable output shaft, a collar affixed to said output shaft, a link having one end pivotally connected to said collar in eccentric relation to the axis of said output shaft, an elongated rod extending down from end end of said agitator shaft, and said link having an end opposite said one end pivotally connected to said rod.

3. A particulate material dispenser as set forth in claim 1, wherein said means for rotatably mounting said agitator shaft comprise bearings affixed to said side walls and receiving said ends of said agitator shaft therethrough and set collars adjacent said bearings providing means whereby said agitator shaft can be adjusted laterally.

4. A particulate material dispenser as set forth in claim 1 and further characterized by said openings being cruciform in shape.

* * * * *